United States Patent [19]
Davison et al.

[11] Patent Number: 5,857,478
[45] Date of Patent: Jan. 12, 1999

[54] DEMAND RESPONSIVE FLOW CONTROL VALVE

[75] Inventors: James Leroy Davison, Freeland; Ronald Duane Elson, Merrill, both of Mich.

[73] Assignee: General Motors Corporation, Detroit, Mich.

[21] Appl. No.: 958,961

[22] Filed: Oct. 28, 1997

[51] Int. Cl.$^6$ .................................................. G05D 7/01
[52] U.S. Cl. ........................................ 137/115.1; 251/285
[58] Field of Search .......................... 137/115.1; 251/285

[56] References Cited

U.S. PATENT DOCUMENTS

| | | | |
|---|---|---|---|
| 4,570,662 | 2/1986 | Anderson et al. | 137/117 |
| 4,570,667 | 2/1986 | Masica et al. | 137/117 |
| 4,629,025 | 12/1986 | Brasier et al. | 180/142 |

Primary Examiner—Gerald A. Michalsky
Attorney, Agent, or Firm—Saul Schwartz; Dean L. Ellis

[57] ABSTRACT

A demand responsive flow control valve including a housing in a fluid conduit between a pump and a motor vehicle power steering gear, a flow control orifice in the fluid conduit, and a valve pintle supported on the housing for linear translation. An inboard stop on the housing engageable by the valve pintle defines an active position of the valve pintle, obstructing the flow control orifice and reducing the effective area of the latter. The inboard stop is a tubular sleeve interference fitted in a bore in the housing. The position of the tubular sleeve on the housing corresponding to the active position of the valve pintle is established by inducing linear translation of the tubular sleeve into the bore in the housing as a unit with the valve pintle while monitoring the corresponding flow rate through the fluid conduit. When the actual flow rate attains a magnitude equal to a desired or scheduled low flow of the flow control valve, the corresponding calibrated position of the tubular sleeve is rigidly captured by friction attributable to the interference fit between the tubular sleeve and the housing.

4 Claims, 3 Drawing Sheets

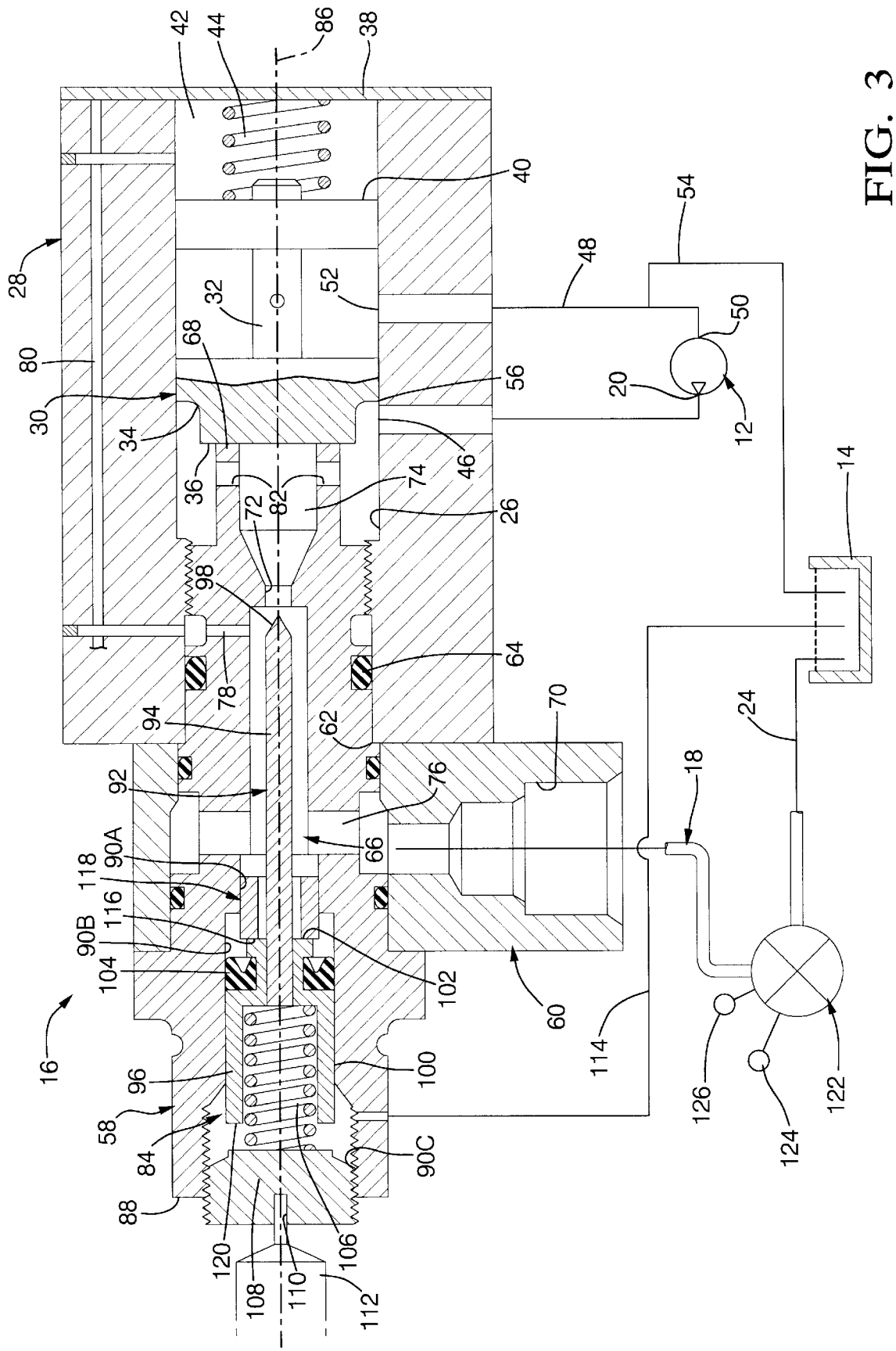

DEMAND RESPONSIVE FLOW CONTROL VALVE

TECHNICAL FIELD

This invention relates to a demand responsive flow control valve between a pump and a motor vehicle power steering gear.

BACKGROUND OF THE INVENTION

U.S. Pat. No. 4,570,662, issued Feb. 18, 1986 and assigned to the assignee of this invention, describes a demand responsive flow control valve between a pump and a motor vehicle power steering gear which regulates a high flow and a low flow in a fluid conduit between the pump and the steering gear depending upon the magnitude of a system pressure downstream of a flow control orifice in the fluid conduit. In the absence of demand for power assist, the system pressure is low and low flow prevails. When power assist is demanded, the system pressure is higher and high flow prevails. The effective area of the flow control orifice is selected in combination with other system variables to achieve a high flow corresponding to predetermined performance characteristics of the steering system. Parasitic losses, e.g., fluid friction, associated with the corresponding low flow consume power and reduce fuel economy of the motor vehicle. U.S. Pat. No. 4,570,667, issued Feb. 18, 1986 and assigned to the assignee of this invention, describes an improved demand responsive flow control valve having a valve pintle which strokes linearly to an active position obstructing the flow control orifice when the aforesaid system pressure is low and which strokes linearly to an inactive position removed from the flow control orifice when the system pressure increases to a higher transition magnitude. When the flow control orifice is obstructed, its effective area and corresponding low flow and parasitic losses are all reduced compared to the effective area and corresponding low flow and parasitic losses of the unobstructed flow control orifice. With this construction, however, the active position of the valve pintle is defined by an integral stop on a housing of the valve, the location of which stop may vary within a range dictated by manufacturing tolerance. Because the location of the integral stop may vary from valve to valve, the corresponding low flows may likewise vary from valve to valve.

SUMMARY OF THE INVENTION

This invention is a new and improved demand responsive flow control valve including a housing in a fluid conduit between a pump and a motor vehicle power steering gear, a flow control orifice in the fluid conduit, and a valve pintle supported on the housing for linear translation. An inboard stop on the housing engageable by the valve pintle defines an active position of the valve pintle obstructing the flow control orifice and reducing the effective area of the latter. The inboard stop is a tubular sleeve interference fitted in a bore in the housing. The position of the tubular sleeve on the housing corresponding to the active position of the valve pintle is calibrated by inducing linear translation of the tubular sleeve into the bore in the housing as a unit with the valve pintle while monitoring the corresponding flow rate through the fluid conduit. When the actual flow rate attains a magnitude equal to a predetermined or scheduled low flow of the flow control valve, the corresponding calibrated position of the tubular sleeve is rigidly captured by friction attributable to the interference fit between the tubular sleeve and the housing so that subsequent linear strokes of the valve pintle to its active position yield the same low flow. By thus calibrating the position of the inboard stop of each flow control valve, low flow variation from valve to valve is eliminated.

BRIEF DESCRIPTION OF THE DRAWINGS

FIG. 3 is similar to FIGS. 1 and 2 showing structural elements of the demand responsive flow control valve according to this invention in relative positions different from each of FIGS. 1 and 2.

DESCRIPTION OF THE PREFERRED EMBODIMENT

Figure 1:
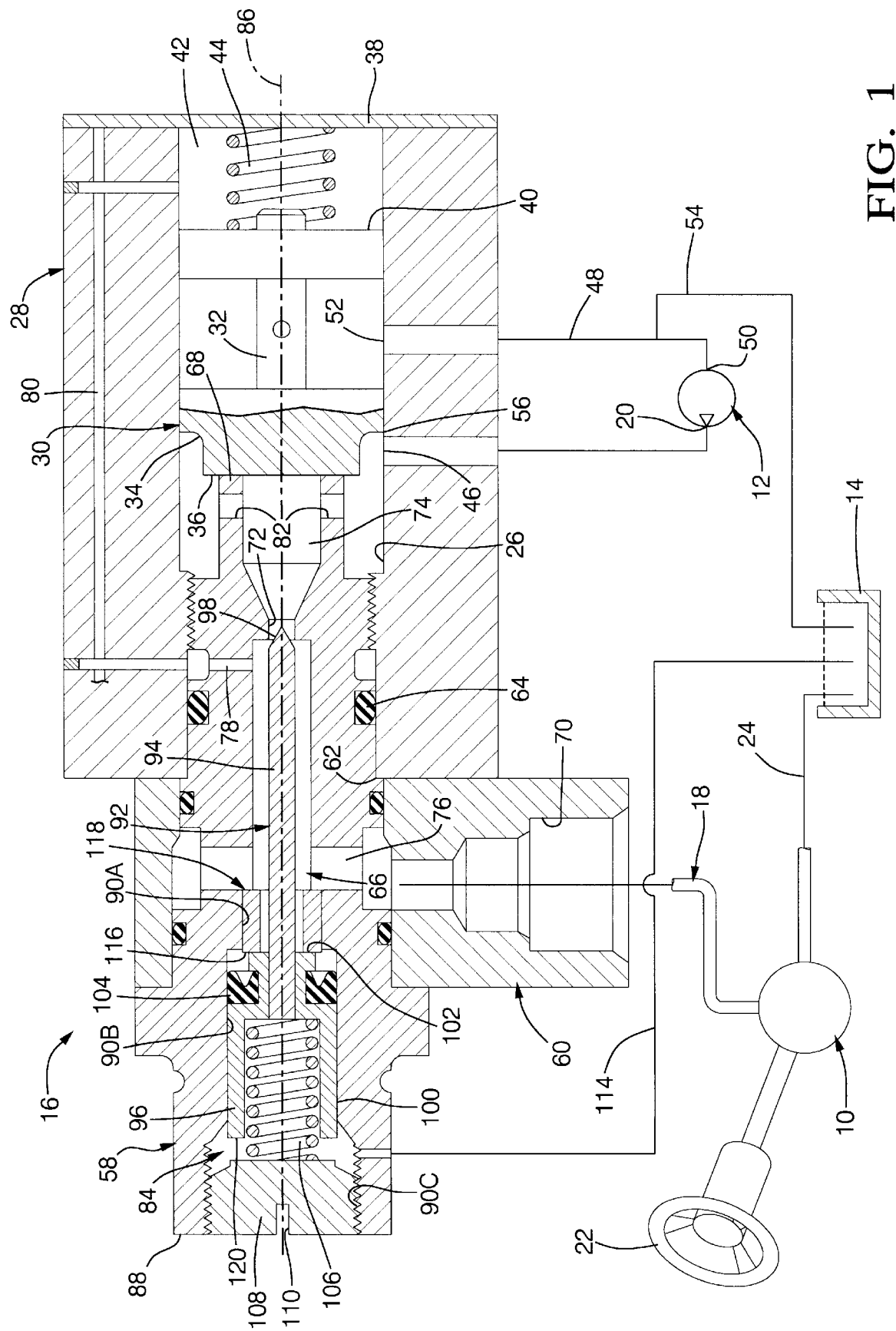
FIG. 1 is a partially broken-away longitudinal sectional view of a demand responsive flow control valve according to this invention.

Referring to FIG. 1, a motor vehicle, not shown, includes an open-center power steering gear 10, a power steering pump 12, a reservoir 14, and a demand responsive flow control valve 16 according to this invention in a fluid conduit 18 between a schematically represented discharge port 20 of the pump and the power steering gear. The power steering pump 12 may be a vane pump as described in U.S. Pat. No. 4,386,891, issued Jun. 7, 1983 and assigned to the assignee of this invention, or have any other conventional construction. The open-center power steering gear may have the construction described in either of U.S. Pat. Nos. 3,022,772 or 4,454,801, issued Feb. 27, 1962 and Jun. 19, 1984 and assigned to the assignee of this invention, or any other conventional construction.

The power steering pump 12 draws fluid from the reservoir 14 and circulates it to the open-center power steering gear 10 through the fluid conduit 18. The open-center power steering gear 10 typically includes a steering assist fluid motor, not shown, connected to steered dirigible wheels of the motor vehicle and a proportional control valve, not shown. The proportional control valve throttles fluid flow through the fluid conduit 18 in response to rotation of a steering wheel 22 of the motor vehicle to regulate a steering assist boost pressure in the fluid conduit between the steering gear and the pump. The proportional control valve distributes the boost pressure to one working chamber of the steering assist fluid motor to provide steering power assist while at the same time connecting another working chamber of the steering assist fluid motor to the reservoir 14 through a drain 24.

Figure 2:
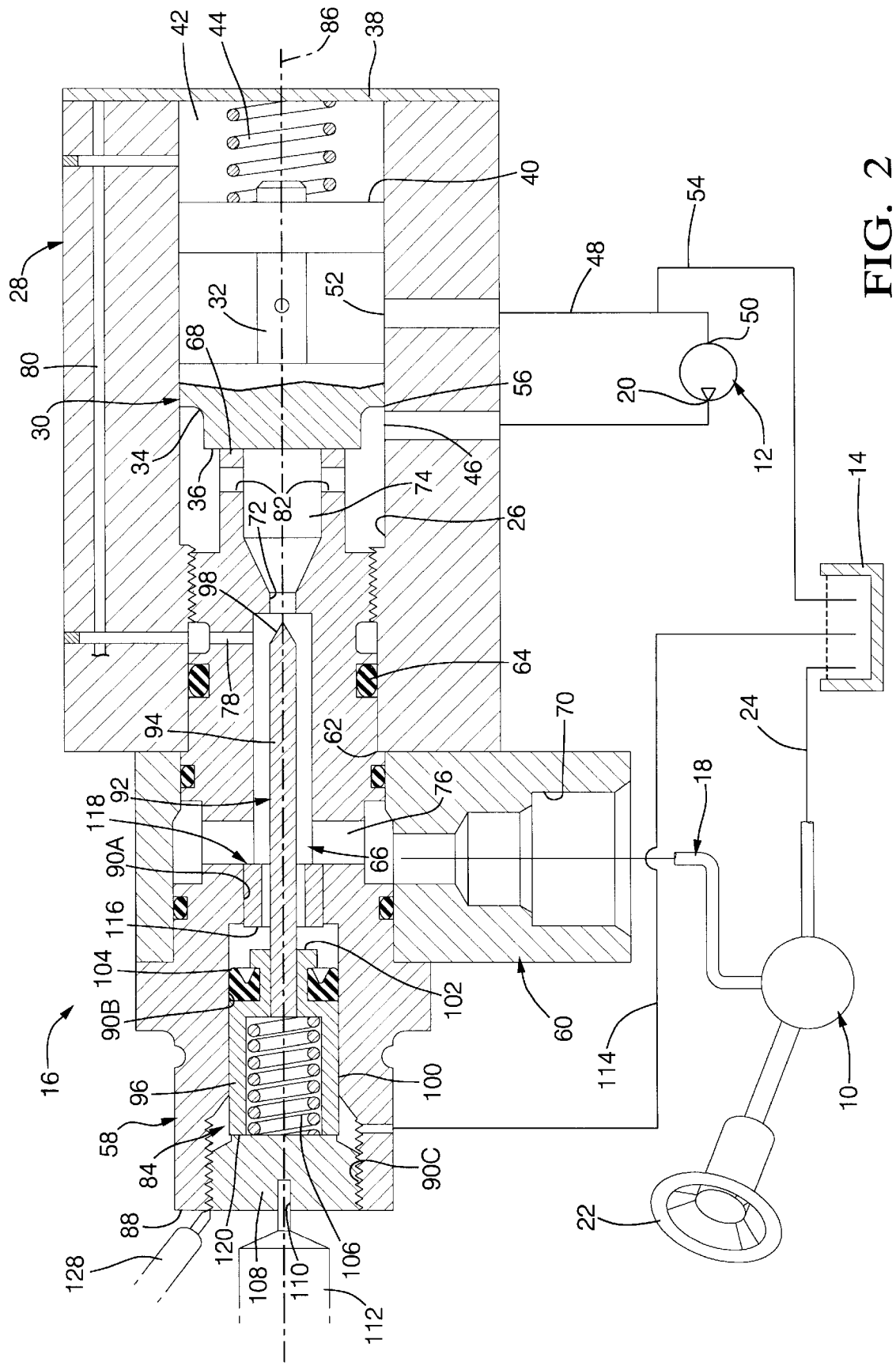
FIG. 2 is similar to FIG. 1 showing structural elements of the demand responsive flow control valve according to this invention in different relative positions.

The demand responsive flow control valve 16 includes a valve bore 26 in a fragmentarily illustrated housing 28 of the valve, which may be integral with a housing of the pump 12, and a valve spool 30 slidably disposed in the valve bore. The valve spool 30 includes a reduced diameter stem 32 in the middle of the spool and an annular groove 34 which opens through a first end 36 of the spool. A plate 38 on the housing 28 cooperates with a second end 40 of the spool 30 in defining a spring chamber 42 in the valve bore 26. A spring 44 in the spring chamber 42 biases the valve spool 26 leftward, FIGS. 1–3.

The fluid conduit 18 between the pump 12 and the open-center power steering gear 10 intersects the bore 26 at an inlet port 46 of the flow control valve 16. A second conduit 48 between a schematically represented suction port 50 of the pump 12 and the flow control valve intersects the bore 26 at a recirculation or supercharge port 52. A branch 54 of the second conduit 48 is connected to the reservoir 14 for conducting fluid from the reservoir to the suction port 50. In conventional fashion, a circular edge 56 of the valve spool 30 at the bottom of the annular groove 34 closes and opens the recirculation port 52 to divert a fraction of the fluid discharged at the discharge port 20 of the pump directly back to the suction port 50 thereof.

The housing 28 of the flow control valve 16 further includes a valve housing 58 and a union housing 60 fitted on the valve housing in fluid tight fashion. The valve housing protrudes into the bore 26 through an outboard end 62 of the latter and is retained therein by screw threads on the valve housing and in the bore. The interface between the valve housing 58 and the bore 26 is sealed against fluid leakage by a seal ring 64. An L-shaped fluid passage 66 of the flow control valve 16 extends from an inboard end 68 of the valve housing 58 facing the end 36 of the valve spool 30 to a schematically-represented socket 70 in the union housing 60 at which the fluid conduit 18 is connected to the union housing. The L-shaped passage 66 thus defines a portion of the fluid conduit 18 between the pump 12 and the opencenter power steering gear 10.

A flow control orifice 72 on the valve housing 58 in the L-shaped passage 66 divides the fluid conduit 18 into an upstream segment 74 between the orifice and the pump 12 and a downstream segment 76 between the orifice and the open-center power steering gear 10. The chamber 42 behind the valve spool 30 communicates with the downstream segment 76 of the fluid conduit 18 through a radial passage 78 in the valve housing and a feedback passage 80 in the housing 28. The spring 44 biases the end 36 of the valve spool 30 against the inboard end 68 of the valve housing 58. A plurality of perforations 82 in the valve housing assure uninterrupted fluid communication between the pump 12 and the open-center power steering gear when the end 36 of the valve spool is seated against the inboard end 68 of the valve housing.

A stepped bore 84 in the valve housing 58 is aligned on a centerline 86 of the housing through the flow control orifice 72. The stepped bore 84 intersects each of the L-shaped fluid passage 66 and an outboard end 88 of the valve housing opposite the inboard end 68 thereof and includes a plurality of three successively larger diameter cylindrical steps 90A, 90B, 90C.

A valve pintle 92 of the flow control valve 16 includes a stem 94 and a cup-shaped piston 96 rigidly attached to the stem. The stem 94 protrudes through the smallest diameter step 90A of the stepped bore and has a conical shoulder 98 facing the flow control orifice 72. The piston 96 has a cylindrical outer wall 100 and an end face perpendicular to the centerline 86 defined by an annular shoulder 102 and a fluid seal 104 on the piston behind the annular shoulder. The outer wall 100 cooperates with the intermediate diameter step 90B of the stepped bore 84 in supporting the valve pintle 92 on the valve housing 58 for linear translation in the direction of the centerline 86. The seal 104 suppresses fluid leakage between the piston 96 and the valve housing 58.

A flow control spring 106 is disposed in the cup-shaped piston 96 of the valve pintle 92 and seats at one end against the piston and at the other end against a plug 108 screwthreaded in the largest diameter step 90C of the stepped bore 84. The screw threads between the plug and the valve housing support the former on the latter for linear translation in the direction of the longitudinal centerline 86 concurrent with rotation of the plug about the longitudinal centerline. A slot 110 in the plug 108 is accessible from outside of the valve housing 58 by a blade of a screw driver or similar tool 112, FIGS. 2–3. The portion of the stepped bore 84 between the piston 96 and the plug 108 is connected to the reservoir through a second drain 114.

An inboard stop 116 of the flow control valve 16 is defined by an end of a tubular sleeve 118 interference fitted in the smallest diameter step 90A of the stepped bore 84 around the stem 94 of the valve pintle. The inside diameter of the tubular sleeve 118 is calculated to afford clearance between the stem and the sleeve so that the end face of the piston 96 defined by the shoulder 102 and the seal 104 is exposed to fluid pressure in the downstream segment 76 of the fluid conduit 18. The tubular sleeve 118 may be a solid sleeve having an oversize diameter relative to the diameter of the step 90A or it may be a tubular spring.

Friction between the tubular sleeve 118 and the step 90A of the stepped bore 84 attributable to the interference fit therebetween rigidly couples the tubular sleeve to the valve housing 58. Rightward linear translation of the valve pintle 92 induced by the thrust of the flow control spring 106 terminates at an active position of valve pintle, FIG. 1, defined by engagement of the shoulder 102 against the inboard stop 116 on the tubular sleeve. Leftward linear translation of the valve pintle 92 induced by the pressure force of the fluid pressure in the downstream segment 76 of the fluid conduit against the end face of the piston terminates at an inactive position of valve pintle, FIG. 2, defined by engagement of an end 120 of the piston against the plug 108.

In conventional fashion for open-center power steering gears, the pump 12 continuously pumps fluid through the fluid conduit 18 to the power steering gear when the prime mover for the pump, e.g., the motor of vehicle, is on. A pressure gradient develops across the flow control orifice 72 characterized by higher fluid pressure in the upstream segment 74 of the fluid conduit 18 and lower fluid pressure in the downstream segment 76. The pressure gradient across the flow control orifice 72 is applied across the valve spool 30 through the radial passage 78 and the feedback passage 80 and induces rightward linear translation of the valve spool against the thrust of the spring 44 to a position, not shown, in which the circular edge 56 of the valve spool uncovers the recirculation port 52 and regulates a flow of a fraction of the discharge of the pump 12 directly back to the suction port 50 of the pump.

In the absence of manual effort applied at the steering wheel 22, the thrust of the flow control spring 106 on the piston 96 exceeds the opposite pressure force attributable to low fluid pressure in the downstream segment 76 of fluid conduit 18. The flow control spring thrusts the pintle to its active position, FIG. 1, defined by the inboard stop 116 in which the shoulder 98 on the stem 94 obstructs and reduces the effective area of the flow control orifice 72. In that circumstance, the pressure gradient across the flow control orifice increases and the valve spool 30 is thrust further rightward to increase the fraction of pump discharge diverted back to the suction port 50 of the pump. The remaining fraction of pump discharge circulates through the fluid conduit 18 to the power steering gear 10 and the reservoir 14 and constitutes the low flow of the demand responsive flow control valve 16.

When manual effort is applied at the steering wheel 22, the aforesaid proportional control valve in the power steering gear 10 throttles fluid flow through the fluid conduit 18 and increases the fluid pressure in the downstream segment 76 of the latter. When the fluid pressure in the downstream segment 76 attains a transition magnitude determined by the magnitude of the thrust of the flow control spring 106 against the piston 96, the corresponding pressure force on the piston overcomes the opposite thrust of the flow control spring and induces linear translation of the valve pintle 92 to its inactive position, FIG. 2, defined by engagement of the end 120 of the piston against the plug 108.

In the inactive position of the valve pintle 92, the shoulder 98 on the stem 94 is removed from the flow control orifice 72 so that the effective area thereof increases to its maximum. In that circumstance, the pressure gradient across the flow control orifice decreases and the valve spool 30 is thrust leftward by the spring 44 to decrease the fraction of pump discharge diverted back to the suction port 50 of the pump. The increased remaining fraction of pump discharge circulates through the fluid conduit 18 to the power steering gear 10 and the reservoir 14 and constitutes the high flow of the demand responsive flow control valve 16. When application of manual effort at the steering wheel 22 ceases, the fluid pressure in the downstream segment 76 of the fluid conduit 18 decreases to less then the transition pressure and the flow control spring 106 strokes the valve pintle 92 back to its active position defined by the inboard stop.

The interference fitted tubular sleeve 118 in the smallest step 90A of the stepped bore 84 is an important feature of this invention which permits the location of the inboard stop 116 to be calibrated to yield precisely a predetermined or scheduled low flow. Referring particularly to FIG. 3, the tubular sleeve 118 is interference fitted in the smallest step 90A to an initial position of the tubular sleeve calculated to arrest linear translation of the valve pintle before the latter attains its active position, FIG. 1. When the valve pintle 92, the flow control spring 106 and the plug 108 are thereafter assembled into the stepped bore 84 behind the tubular sleeve so that the flow control spring 106 thrusts the shoulder 102 against the inboard stop 116 defined by the tubular sleeve, the shoulder 98 on the stem is substantially removed from the flow control orifice.

The valve housing 58 is installed in the valve bore 26 and the fluid conduit 18 is connected at one end to the pump 12 and at the other end to a schematically-represented calibration valve and transducer 122, FIG. 3, operative to simulate the proportional control valve of the power steering gear by throttling flow through the fluid conduit 18 and to measure and display the fluid pressure and flow rate in the fluid conduit 18 at a pressure gage 124 and a flow meter 126. The pump 12 is rotated to initiate fluid flow through the fluid conduit and the calibration valve and transducer 122 is actuated to throttle fluid flow through the fluid conduit until the fluid pressure in the downstream segment 76 of the fluid conduit exceeds a predetermined or scheduled transition pressure of the flow control valve 16. The fluid flow rate through the downstream segment 76 of the fluid conduit 18 exceeds a predetermined or scheduled low flow of the flow control valve.

Outside of the valve housing 58, the blade of the tool 112 is inserted in the slot 110 in the plug 108 and the plug is rotated in a first direction corresponding to linear translation of the plug toward the tubular sleeve 118 to actuate a drive means for the tubular sleeve 118 constituted by the plug, the flow control spring 106 and the piston 96 on the valve pintle. As the plug 108 advances, the flow control spring 106 is compressed and the thrust thereof on the piston 96 and on the tubular sleeve 118 increases. When the thrust of the flow control spring exceeds the frictional couple between the tubular sleeve and the smallest step 90A of the stepped bore, or when the plug engages the end 120 of the piston 96, the tubular sleeve 118 and the valve pintle 92 commence unitary linear translation toward the flow control orifice.

As the shoulder 98 on the stem 94 of the valve pintle 92 approaches the flow control orifice 72, the effective area of the latter begins to decrease as does the fluid flow rate through the fluid conduit 18 due to the corresponding increase in the fraction of discharge of the pump 12 diverted to the suction port 50 thereof. The tool 112 continues to rotate the plug 108 until the flow meter 126 indicates visually or by signal that the fluid flow rate in the fluid conduit 18 equals a predetermined or scheduled low flow for the flow control valve 16. Rotation of the plug 108 in the first direction is then discontinued and the tubular sleeve 118 becomes frictionally recoupled to the smallest step 90A of the stepped bore in the precise position at which the inboard stop 116 will yield the scheduled low flow each time the valve pintle strokes to its active position.

With the position of the inboard stop 116 thus calibrated, the tool 112 rotates the plug 108 in an opposite second direction corresponding to linear translation of the plug away from the tubular sleeve 118. As the plug 108 separates from the inboard stop 116, the flow control spring 106 expands and the thrust thereof on the piston 96 decreases. When the thrust of the flow control spring becomes less than the fluid force on the end face of the piston 96 attributable to the aforesaid transition pressure in the downstream segment 76 of the fluid conduit 18, the valve pintle 92 translates or strokes leftward to its inactive position, FIG. 2, removed from the flow control orifice 72. The position of the plug 108 corresponding to the onset of the stroke of the valve pintle from its active position to its inactive position is captured by a tool 128, FIG. 2, which stakes the plug to the valve housing 58.

Having thus described the invention, what is claimed is:

1. In a demand responsive flow control valve in a fluid conduit between a pump and a motor vehicle power steering gear including a housing having a passage therein defining a portion of said fluid conduit, a flow control orifice in said passage dividing said fluid conduit into an upstream segment connected to said pump and a downstream segment connected to said steering gear, a valve pintle mounted on said housing for linear translation toward said flow control orifice to an active position obstructing said flow control orifice and reducing the effective area thereof to reduce the fluid flow rate in said downstream segment of said fluid conduit to a predetermined low flow, and a stop means on said housing defining an inboard stop operative to terminate linear translation of said valve pintle toward said flow control orifice at said active position thereof, the improvement comprising:

an interference fit between said stop means and said housing frictionally coupling said stop means to said housing in an initial position of said stop means wherein said inboard stop thereon terminates linear translation of said valve pintle toward said flow control orifice before said valve pintle attains said active position thereof, and a drive means operative from outside of said housing during fluid flow through said fluid conduit at a rate exceeding said predetermined low flow to calibrate the position of said inboard stop by thrusting said valve pintle against said inboard stop with a force exceeding said frictional couple between said stop means and said housing and by thereafter inducing linear translation of said stop means as a unit with said valve pintle from said initial position of said stop means toward said flow control orifice until said valve pintle obstructs said flow control orifice and reduces said fluid flow rate in said downstream segment of said fluid conduit to said predetermined low flow.

2. The demand responsive flow control valve recited in claim 1 wherein said stop means on said housing comprises:

a tubular sleeve interference fitted in a bore in said housing having an end facing said valve pintle and defining said inboard stop.

3. The demand responsive flow control valve recited in claim 2 wherein said drive means operative from outside of said housing during fluid flow through said fluid conduit at a rate exceeding said predetermined low flow to calibrate the position of said inboard stop comprises:

a plug supported on said housing for linear translation toward and away from said flow control orifice, a driver on said plug accessible from outside of said housing to effect linear translation of said plug toward said flow control orifice during fluid flow through said fluid conduit at said rate exceeding said predetermined low flow, a flow control spring between said driver and said valve pintle, and an edge on said valve pintle facing said plug and engageable on said plug to limit linear translation of said valve pintle away from said flow control orifice to an inactive position remote from said flow control orifice, said plug being operative through one of said flow control spring and said edge on said valve pintle to increase the thrust of said valve pintle on said tubular sleeve in said initial position of said tubular sleeve concurrent with linear translation of said plug toward said flow control orifice until said frictional couple between said tubular sleeve and said housing is exceeded and to thereafter induce linear translation of said tubular sleeve as a unit with said valve pintle from said initial position of said tubular sleeve toward said flow control orifice until said valve pintle obstructs said flow control orifice and reduces the fluid flow rate in said downstream segment of said fluid conduit to said predetermined low flow.

4. The demand responsive flow control valve recited in claim 3 wherein:

said plug is supported on said housing for linear translation toward and away from said flow control orifice by an outside screw thread on said plug received in an inside screw thread in a bore in said housing.

* * * * *